Oct. 18, 1960  W. J. METZGER  2,956,694
CAR COUPLER

Filed Oct. 1, 1956  6 Sheets-Sheet 1

INVENTOR.
WILLIAM J. METZGER
BY Henry Kozak
ATTORNEY

Oct. 18, 1960 W. J. METZGER 2,956,694
CAR COUPLER
Filed Oct. 1, 1956 6 Sheets-Sheet 2

INVENTOR.
WILLIAM J. METZGER
BY
Henry Kozak
ATTORNEY

Oct. 18, 1960 W. J. METZGER 2,956,694
CAR COUPLER
Filed Oct. 1, 1956 6 Sheets-Sheet 3

Fig. 8
Fig. 9
Fig. 10

INVENTOR.
WILLIAM J. METZGER
BY Henry Kozak
ATTORNEY

Oct. 18, 1960 W. J. METZGER 2,956,694
CAR COUPLER
Filed Oct. 1, 1956 6 Sheets-Sheet 4

INVENTOR.
WILLIAM J. METZGER
BY Henry Kozak
ATTORNEY

Oct. 18, 1960 W. J. METZGER 2,956,694
CAR COUPLER

Filed Oct. 1, 1956 6 Sheets-Sheet 6

INVENTOR.
WILLIAM J. METZGER

BY Henry Kozak

ATTORNEY

United States Patent Office 2,956,694
Patented Oct. 18, 1960

2,956,694
CAR COUPLER

William J. Metzger, East Cleveland, Ohio, assignor to National Malleable and Steel Castings Company, Cleveland, Ohio, a corporation of Ohio Filed Oct. 1, 1956, Ser. No. 613,133

25 Claims. (Cl. 213—100)

The invention relates to automatic car couplers for railway vehicles, and more specifically to a lightweight, tight-locking coupler, particularly adapted for use on lightweight trains.

The present trend in railway vehicles, and especially passenger car equipment, is toward lightweight, low-slung designs which provide, among other things, better riding qualities, more economy of operation, and greater ease in handling. With the lower center of gravity of the new cars and resultant lower floor levels, it is also desirable to lower the position of the coupler with respect to the car and to the top of the rails of the track bed. Present standard types of coupling devices, because of their size or operating principle, are generally not satisfactory for this low-slung design.

The present invention provides a novel, lightweight, tight-locking car coupler possessing the necessary strength requirements and comprising a low depth head, a spring actuated coupling hook mounted in the head for interlocking engagement with the hook of an opposing similar coupler when the couplers are in coupled position, and wings extending laterally from the head for gathering and aligning the coupler during coupling operations. The wings also embody means adapted for cooperation with complementary means on the opposing coupler to prevent relative lateral and vertical movement of the couplers when in coupled position. In addition, the invention provides automatic coupling mechanism, formed integrally with the coupler head, for the air, steam and electrical service lines of the train, thus eliminating the necessity of flexible hose couplings between train units.

Therefore, the primary object of the invention is to provide an automatic, tight-locking coupler mechanism, particularly adapted for use on lightweight trains.

Another object of the invention is to provide a car coupler of the aforementioned type, comprising integral automatic coupling mechanism for the train service lines.

A further object of the invention is to provide a lightweight tight-lock type railway car coupling that couples automatically upon impact with an opposing similar coupler without the necessity of any prior actuation or attention to the mechanism.

A still further object of the invention is to provide a coupler of the above-mentioned type embodying novel means for positive and efficient gathering of the couplers when the latter are displaced vertically or laterally or both relative to one another.

Another object of the invention is to provide a coupler of the above-mentioned type, wherein the gathering means is so constructed and arranged that the final movement of the couplers into coupled position is in a longitudinally, straight forward direction so that there is no possibility of injury to the train service line connections on the front faces of the opposing couplers during coupling.

A more specific object of the invention is to provide a tight-lock coupler having a low depth head and comprising laterally extending gathering and aligning wings which embody projection and pocket structure adapted to cooperate with complementary structure on the wings of a similar opposing coupler to prevent lateral or vertical displacement of the couplers when in coupled position.

Another specific object of the invention is to provide a car coupler of the tight-locking type, comprising a horizontally pivoted coupling hook mounted in the coupler head in combination with a vertically pivoted lock and a horizontally pivoted uncoupling cam, the cam, upon actuation of the uncoupling rod of the coupler, being adapted to move the coupling hook on the opposing coupled coupler out of coupling position to permit separation of the mated couplers.

Other objects and advantages of the invention will be apparent from the following description taken in conjunction with the drawings, in which.

Figure 3:
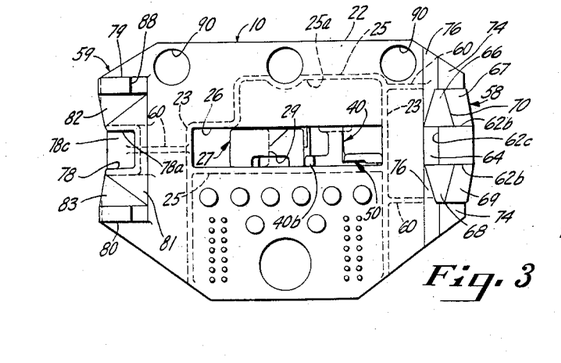
Fig. 3 is a front elevational view of the coupler.
Figure 8:
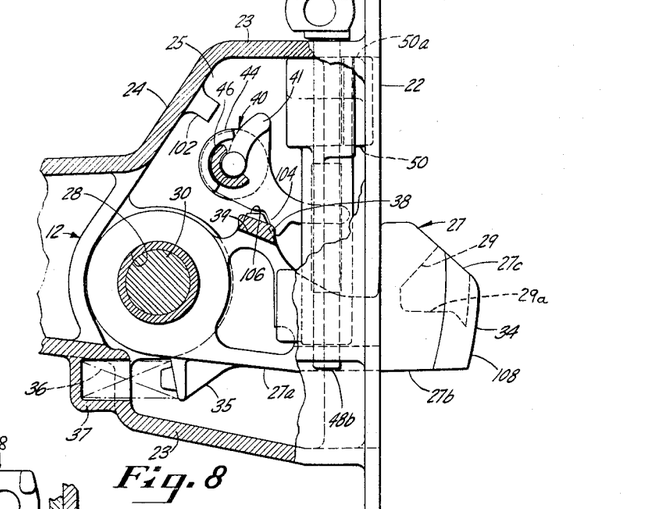
Fig. 8 is a plan view, partly in section, of the coupler head and associated operating parts.

Referring to the drawings, there is shown a coupler 10 having a head 12 with an integral shank 14 received within a yoke 16 and secured thereto by a vertical pin 17 extending through an opening 18 in the shank. The opening contains a bearing block 19 in slidable engagement with pin 17 and having complementary arcuate thrust engagement with the shank. The connection between the coupler shank and yoke is such as to allow both horizontal and vertical angling of the coupler. The coupler is resiliently supported on car body structure 20 by conventional coupler carrier support mechanism 21. It will be noted that support mechanism 21 permits both vertical and horizontal angling of the coupler with respect to the car underframe. The coupler head 10 is of hollow, polyhedral-like configuration, comprising in general a front face plate 22, side walls 23, rear wall 24 and top and bottom walls 25 (Figs. 3 and 8). Top wall 25 is offset upwardly over a portion of its width to define an upper chamber portion 25a in the head (Fig. 3). Face plate 22 is disposed at substantially right angles to the longitudinal axis of the coupler and comprises a transverse opening 26 therein through which coupling hook 27 projects.

Figure 13:
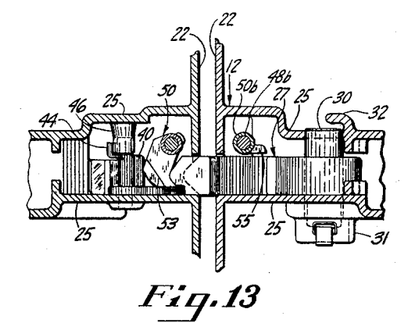
Fig. 13 is a sectional view taken along line 13—13 of Fig. 11.
Figure 15:
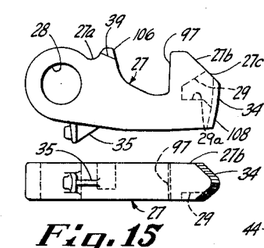
Fig. 15 illustrates plan and side elevational views of the coupling hook of the coupler.
Figure 16:
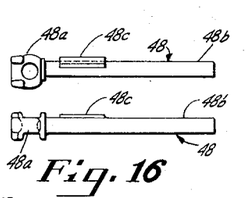
Fig. 16 illustrates plan and side elevational views of the uncoupling rotor shaft member of the coupler.

Coupling hook 27 comprises a body portion 27a (Fig. 15) having a vertically extending opening 28 in the rearward end thereof, and a hook-shaped head portion 27b. Portion 27b has a recess 29 in the front face thereof for a purpose to be hereinafter set forth. Hook 27, as seen in Fig. 13, is supported on bottom wall 25 of the head and is pivotally mounted on the latter for horizontal movement by means of pin 30. Pin 30 extends through openings in the top and bottom walls 25 of the head and is adapted to receive the full pulling force of the opposing coupled coupler. Pin 30 is supported in the head by pin support mechanism 31 (Fig. 13) and is limited in its upward movement by flange 32 on top wall 25 of the head.

A portion of the front end surface of hook 27 is preferably tapered generally convexly in a vertical direction as at 34 (Figs. 4 and 15) to ensure sliding engagement between the coupling hook and the hook of the opposing coupler during coupling, when the couplers are laterally displaced as well as disposed at different elevations.

Extending laterally from the outer side of hook member 27 at the rearward end thereof, is a ledge 35 for abutting engagement with the forward end of spring means 36 (Fig. 8) in the coupler head. The rearward end of spring means 36 is received in pocket portion 37 in rear wall 24 of the coupler head. Spring 36 is assembled under a slight initial compression to urge hook 27 into coupling position. Stop flange 38 (Figs. 4, 8 and 9) extends downwardly from the top wall 25 of the head and is engageable with abutment seat 39 on hook 27 to limit movement of the hook under the influence of spring 36 toward coupling position. Movement of hook 27 out of coupling position is limited by the engagement thereof with adjacent side wall 23 of the head. The front face of the hook is tapered sharply rearwardly in a transverse direction on its inner side, as at 27c, to aid in aligning the couplers for coupling as will be hereinafter described.

Disposed laterally of hook 27 and pivotally mounted on bottom wall 25 of the head is an uncoupling member or hook actuating cam 40 (Figs. 8, 9, 10 and 18). Cam 40 is pivotally mounted for horizontal movement in the coupler head by means of upper and lower trunnions 42 and comprises a generally vertically disposed body portion 40a and a generally horizontally extending arm portion 40b which is adapted to be received in the aforementioned recess 29 in the coupling hook of an opposing coupler when the couplers are in coupled position. Body portion 40a comprises a substantially vertical wall 41 which, in the embodiment shown, is of generally arcuate configuration. Wall 41 is adapted for cooperation with the lock of the coupler to cause cam 40 to pivot and thus move the coupling hook on the opposing coupled coupler out of coupling position, as will be hereinafter described. Adjacent the rearward side of upper trunnion 42, body portion 40a of the cam has an upstanding, arcuate flange 44 which is adapted to cooperate with a complementary arcuate projection 46 (Figs. 8, 10, 13 and 14) depending from top wall 25 of the coupler head and received between flange 44 and trunnion 42 for maintaining the cam in assembled position in the head.

Extending through side walls 23 of the head, in the vicinity of the offset upper chamber portion 25a thereof, and pivotally mounted thereon is uncoupling rotor shaft member 48 (Figs. 8, 11, 12 and 16). Shaft 48 comprises eye portion 48a which is adapted for connection to any suitable uncoupling mechanism, such as an uncoupling rod, and a horizontal cylindrical shank portion 48b adapted for assembly with lock member 50. Shank portion 48b has a projecting key portion 48c formed integrally therewith.

Figure 10:
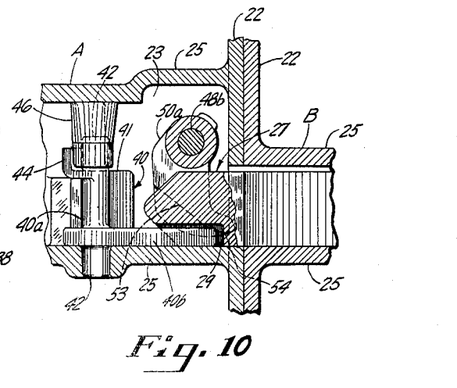
Fig. 10 is a sectional view taken generally along line 10—10 of Fig. 9 with the lock of the coupler on the left being shown in locking position.
Figure 11:
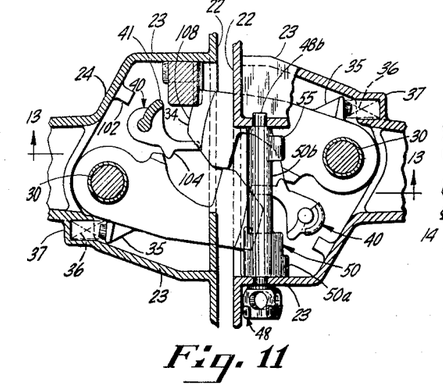
Fig. 11 is a reduced size plan view, partly in section, of a pair of opposing couplers showing the engagement and associated pivotal movement of the coupling hooks during coupling operations.
Figure 17:
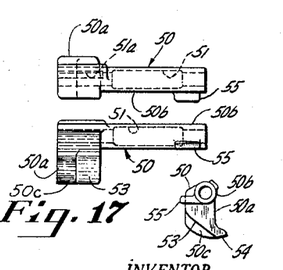
Fig. 17 illustrates plan, side and end elevational views of the lock of the coupler, the end view being taken from the right.
Figure 18:
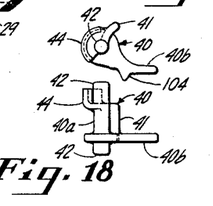
Fig. 18 illustrates plan and side elevational views of the uncoupling cam of the coupler.

Lock 50 comprises a vertically disposed locking and coupler actuating portion 50a and a tubular section 50b extending laterally from the inner side of portion 50a. The lock 50 is longitudinally cored out as at 51 to receive the aforementioned shank portion 48b of the rotor shaft with key 48c on the shank being received in key slot 51a (Fig. 17) in the lock to positively fasten the latter to the rotor shaft. It will be seen, therefore, that lock 50 will pivot with rotor shaft 48 upon rotation of the latter. Portion 50a of the lock embodies a forwardly and downwardly sloping cam surface 53 (Figs. 10, 13 and 17) on its rearward side. The upper portion of surface 53 is substantially flat while the lower portion thereof is arcuately curved as at 54 (Figs. 10, 14 and 17).

Figure 12:
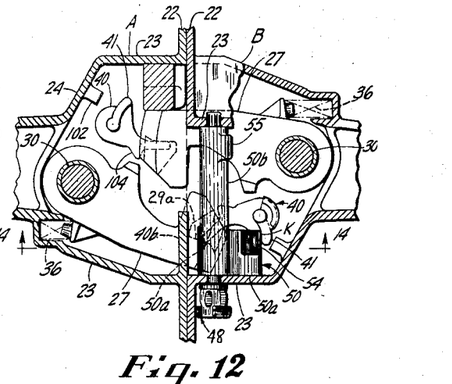
Fig. 12 is a reduced size plan view similar to Fig. 11, but showing the lock of the coupler on the right moved to lock-set position to thus actuate the uncoupling cam and move the coupling hook of the coupler on the left out of coupling position.

Upon actuation of uncoupling shaft 48, lock 50 swings rearwardly and surface 53 thereon is adapted to engage the forward end of wall 41 on cam member 40. This causes the cam to rotate in a counterclockwise direction, whereby cam arm 40b engages surface 29a in recess 29 of the coupling hook on an opposing coupled coupler to swing the hook out of coupling position, as shown in Fig. 12.

Tubular portion 50b of the lock comprises lug 55 (Figs. 11, 13 and 17) adjacent an outer end adapted for engagement with the top surface on coupling hook 27 to limit forward rotation of body portion 50a of the lock.

It is desirable to limit rotation of the lock forwardly of the coupler in order to prevent arm 40b of uncoupling cam member 40 from inadvertently becoming wedged behind body portion 50a of the lock and preventing operation thereof.

Figure 1:
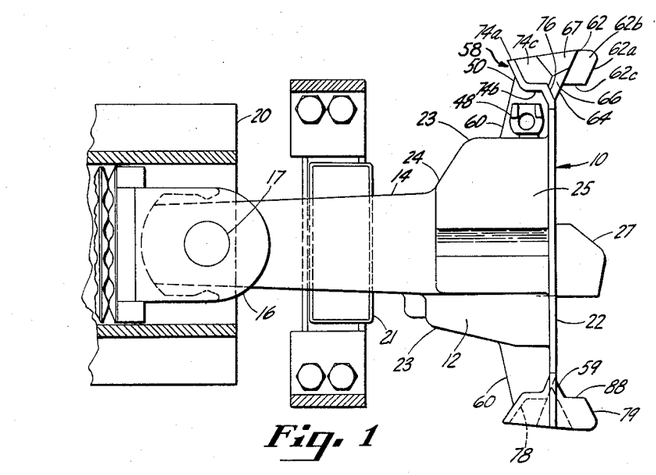
Fig. 1 is a plan view of the novel coupler showing a conventional method of mounting the coupler on the associated car.

Extending laterally from side walls 23 of the coupler head and forming a continuation of face plate 22 are wings 58 and 59 which not only align opposing couplers for coupling, but also provide interlocking means for preventing relative vertical and horizontal movement between the couplers when the latter are in coupled position. Wings 58 and 59 are reinforced by transverse webs 60 (Figs. 1 and 3).

Figure 7:
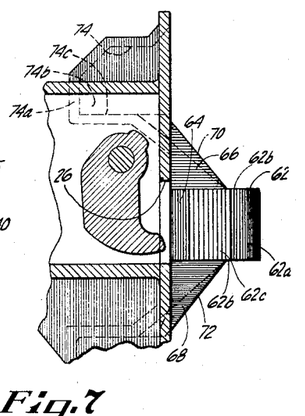
Fig. 7 is a fragmentary sectional view taken along line 7—7 of Fig. 4.

Wing 58 is formed with a forwardly extending projection 62 (Figs. 1, 4 and 7) disposed adjacent its outer end. The projection has a front face 62a which tapers rearwardly toward the longitudinal center line of the coupler. Projection 62 also comprises generally horizontal top and bottom surfaces 62b and inner side surface 62c (Figs. 1 and 7). Surface 62c extends substantially directly rearwardly from the inner extremity of front surface 62a and merges at its rearward end with vertically extending diagonal guide surface 64 (Figs. 1, 3, 4 and 7). Surface 64 is substantially parallel to surface 62a and at its rearward end merges into front face of wing 58.

Figure 4:
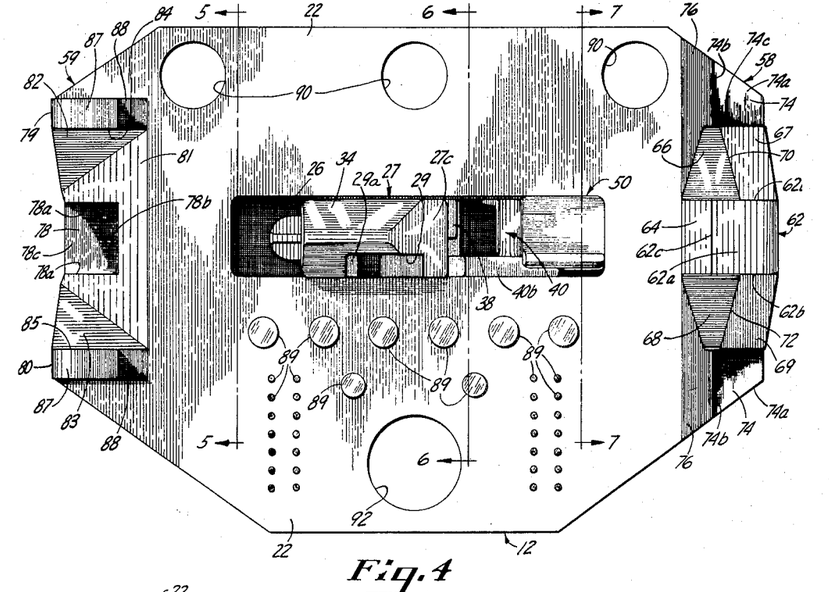
Fig. 4 is an enlarged front elevational view similar to Fig. 3 but showing in greater detail the aligning wings and front face plate of the coupler.

Disposed above and below projection 62 and sloping rearwardly from the rearward extremities of top and bottom surfaces 62b thereon are upper and lower aligning surfaces 66, 67, 68 and 69 (Figs. 3, 4 and 7). Upper surfaces 66 and 67 slope upwardly and rearwardly from top surface 62b of the projection and intersect with one another along a diagonally and rearwardly sloping line 70. Bottom surfaces 68 and 69 slope downwardly and rearwardly from the rearward extremity of bottom surface 62b on projection 62 and intersect along diagonally and rearwardly sloping line 72.

Disposed above surfaces 66 and 67, and below surfaces 68 and 69, are pocket portions 74. Each pocket portion 74 comprises vertical rear wall 74a, vertical side wall 74b, and a substantially horizontal connecting wall 74c extending forwardly from walls 74a and 74b (Fig. 1) to merge with sloping surfaces 66 and 67. Adjacent the forward extremity of side walls 74b, wing 58 is tapered rearwardly, both above and below projection 62, to form diagonal guide surfaces 76 for aligning opposing couplers as will be hereinafter described.

Figure 2:
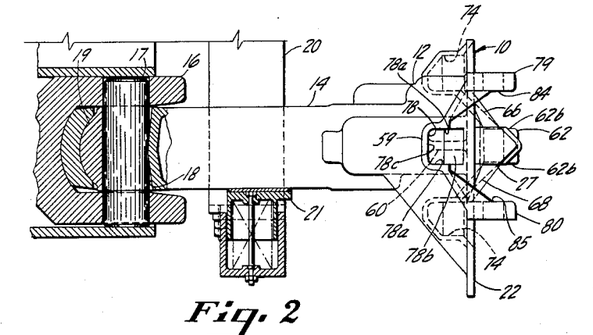
Fig. 2 is a side elevational view, partly in section, of the Fig. 1 arrangement.
Figure 5:
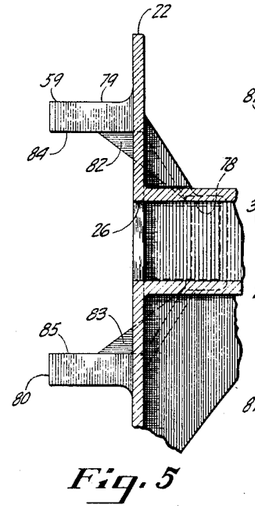
Fig. 5 is a fragmentary sectional view taken along line 5—5 of Fig. 4.
Figure 6:
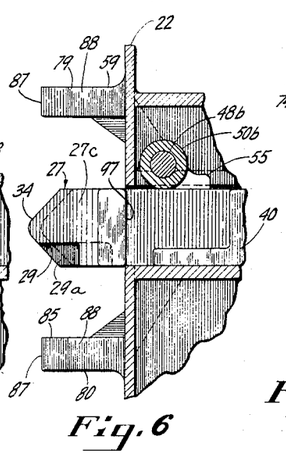
Fig. 6 is a fragmentary sectional view taken along line 6—6 of Fig. 4.

Wing 59 comprises centrally disposed pocket section 78 (Figs. 2, 3 and 4) and vertically spaced forwardly extending lug portions 79 and 80, located on opposite sides of the pocket section. Pocket section 78 is adapted to receive projection 62 on wing 58 of an opposing similar coupler during coupling operations and is defined by top and bottom walls 78a, side wall 78b, and rear wall 78c (Figs. 2 and 4). Top and bottom walls 78a and side wall 78b are adapted for engagement respectively with the aforementioned top and bottom surfaces 62b and surface 62c on projection 62 of an opposing coupled coupler to prevent relative vertical and horizontal displacement between the couplers when in coupled position. Between lugs 79 and 80, wing 59 comprises a vertically disposed rearwardly and outwardly extending aligning surface 81 which is sloped complementally to guide surfaces 62a and 64 on wing 58 of the coupler. Extending forwardly from surface 81 are triangularly shaped, diagonal top and bottom aligning surfaces 82 and 83 which are sloped complementally to respectively the upper and lower guide surfaces 67 and 69 on wing 58 of the coupler. Top aligning surface 82 slopes upwardly and merges with the undersurface 84 of upper lug 79 (Fig. 5), while bottom aligning surface 83 slopes downwardly and merges with top surface 85 on bottom lug 80. The undersurface 84 on lug 79 and top surface 85 on lug 80 are adapted for engagement with the aforementioned horizontal connecting walls 74c in pockets 74 on wing 58 of an opposing similar coupler to prevent relative vertical movement therebetween. It will be noted that the forward surface 87 on each of projections 79 and 80 is sloped complementally to rear walls 74a of pocket portions 74 as well as to tapered guide surfaces 76 on wing 58. Each of projections 79 and 80 also comprises inner side surface 88 which extends substantially directly rearwardly from the inner extremity of front tapered surface 87 on the projection. Surfaces 88 are adapted for engagement with side walls 74b of pocket portions 74 on an opposing similar coupler to prevent relative lateral displacement of the couplers when in coupled position. It will be seen, therefore, that the pocket and projection structure provided by wings 58 and 59 forms a strong and positive vertical and lateral interlock between coupled couplers. This interlocking of the couplers will resist telescoping of associated cars during collisions and derailment and will prevent a pulled-out coupler from dropping to the rail bed and possibly causing a derailment.

A feature of the invention resides in forming the train service line connections integrally with the front face plate of the car coupler. As can be best seen in Figs. 3 and 4, numerals 89, 90 and 92 designate respectively electrical, air and steam line connections for the train. When two opposing couplers meet for coupling, the aforementioned connections on one coupler are automatically aligned and coupled with those on the opposing coupler, thus avoiding flexible hose couplings and eliminating manual coupling of the service line connections between the cars.

Figure 19:
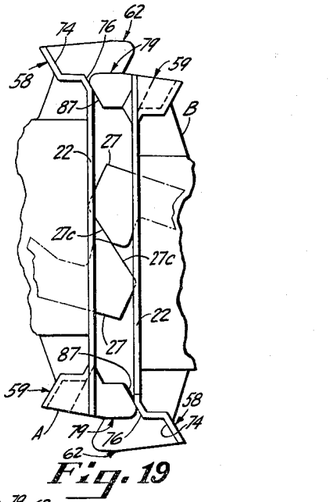
Fig. 19 is a fragmentary plan view showing the engagement between the aligning wings on the opposing couplers to align laterally displaced couplers during coupling.
Figure 20:
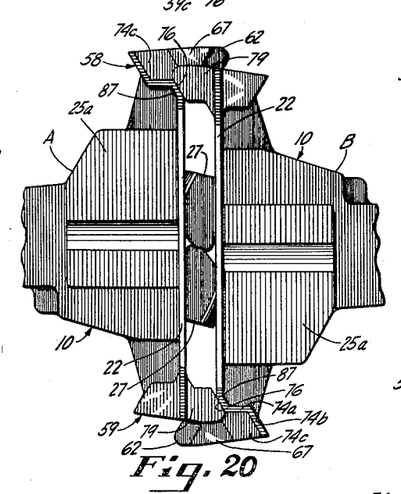
Fig. 20 is a plan view showing further gathering from the Fig. 19 position as the couplers move toward coupled position.
Figure 21:
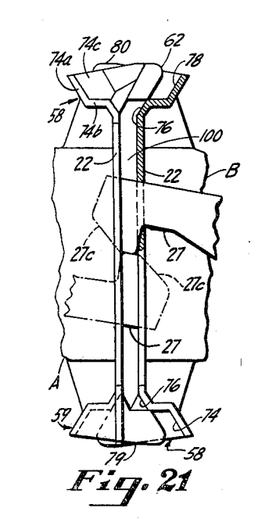
Fig. 21 is a fragmentary plan view, partly in section, showing movement of the couplers following that of Fig. 20, the interlocking projections on the aligning wings of the couplers just commencing to enter the complementary recesses in the opposing coupler.
Figure 22:
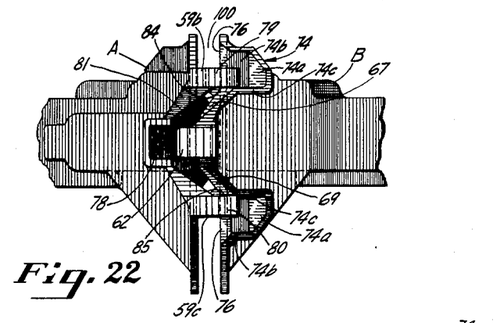
Fig. 22 is a side elevational view showing substantially the same position of the couplers as illustrated in Fig. 21.
Figure 24:
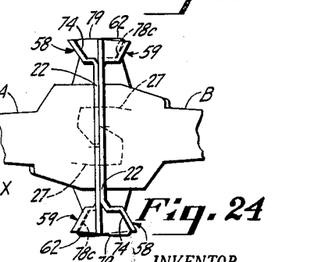
Fig. 24 is a plan view of a pair of opposing couplers in coupled position, the coupling hooks of the couplers being shown in dotted lines.

Another feature of the invention is the horizontal gathering ability of the coupler. This is particularly illustrated in Figs. 19 to 22, inclusive, of the drawings where two opposing couplers A and B are shown in the process of coupling. As seen in Fig. 19, the initial point of contact between laterally displaced couplers as they move toward one another for coupling occurs between the forward end surfaces 87 on upper and lower projections 79 and 80 on wings 59 and the beveled surfaces 76 of the opposing couplers. Also, engagement occurs between the front beveled surfaces 27c on the coupling hooks of the opposing couplers. It will be understood that as couplers A and B initially move toward coupled position, the beveled surfaces 27c on coupling hooks 27 slide transversely of one another, thus exerting a lateral force that causes the hooks to be swung outwardly against the pressure of springs 36 to the positions shown in Fig. 19. Upon further movement of the couplers toward one another to the Fig. 20 position, the head portion 27b on each hook begins to move past the head portion of the opposing hook. Moreover, relative sliding between complementary surfaces 76 and 87 causes couplers A and B to move transversely of one another toward aligned position. As movement of the couplers continues, they become positioned as shown in Figs. 21 and 22, wherein the couplers are substantially aligned and the projections on one coupler just commence to enter the complementary pocket portions on the opposing coupler. It will be observed in Figs. 21 and 22 that considerable clearance exists as at 100 between the face plates 22 of the opposing couplers. Thus, final movement of the interlocking projections on one coupler into the pocket portions of the opposing coupler will be in a longitudinally straight direction, thereby eliminating the possibility of injury to the aforementioned train service line connections on the front face plates of the couplers, as might be the case if the couplers came to their final coupled position in a sidewise direction. With the couplers in final coupled position, as in Fig. 24, the face plate 22 on one coupler is in tight engagement with the face plate on the opposing coupler. It will be seen that the coupling hook 27 is so disposed, with respect to front face plate 22, that when two couplers are in coupled position (coupling hooks interengaged) the face plates 22 thereof are in the aforesaid tight surface-to-surface engagement. Furthermore, the projections 62, 79 and 80 on one coupler are disposed respectively in pocket portions 78, 74 and 74 on the opposing coupler, to prevent relative vertical and lateral movement between the couplers. It will also be seen that in coupled position, the coupling hook 27 on one coupler extends into opening 26 in the head chamber of the opposing coupler to supplement the complementary projection and pocket structure on the wings 58 and 59 of the couplers to additionally aid in interlocking the couplers against relative vertical displacement.

Figure 23:
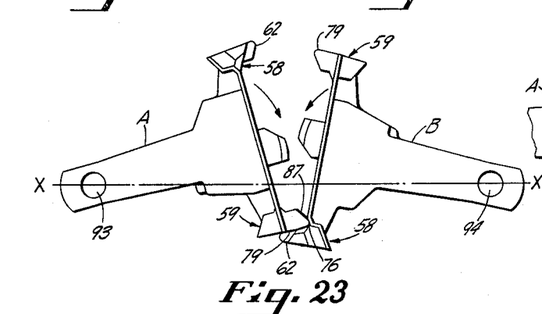
Fig. 23 is a plan view illustrating the gathering movement of couplers when laterally angled to the same side of a longitudinal center line connecting the pivotal centers of the couplers.

Fig. 23 illustrates the gathering range of the couplers when the latter are angled laterally to the same side of a center line X—X which connects the pivotal centers of the couplers, it being assumed, for purposes of illustration, that the vehicles to which the couplers are attached are in longitudinal alignment. The upper and lower projections 79 and 80 on wing 59 of coupler A initially engage opposing tapered surfaces 76 on wing 58 of coupler B, after which the couplers are caused to pivot in the direction of the arrows into aligned position for coupling.

Figure 9:
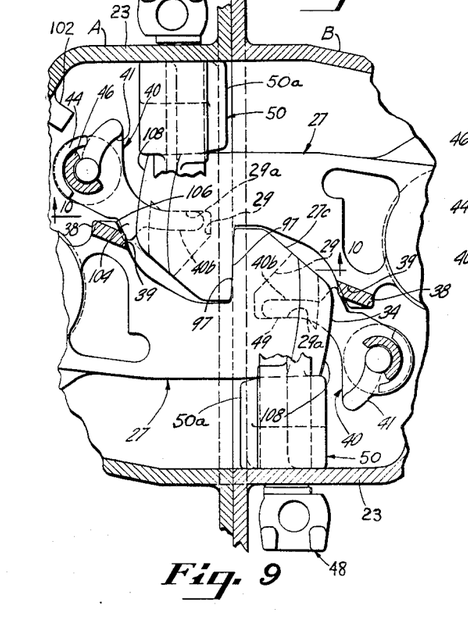
Fig. 9 is a fragmentary sectional plan view showing a pair of opposing couplers in coupled position, the locks of the couplers having been cut-way to better illustrate the interengagement of the coupling hooks of the couplers.

As may be best seen from Fig. 9, which shows opposing couplers in coupled position, the engaged pulling faces 97 on the coupling hooks 27 are tapered transversely, commencing at the body of the hook and extending in a direction forwardly and outwardly of the coupler. The reason for this taper is to permit lateral movement of one hook relative to the other by actuation of rotor shaft 48 when intentional disengagement of the hooks is to be effected, as during uncoupling operations.

Figure 25:
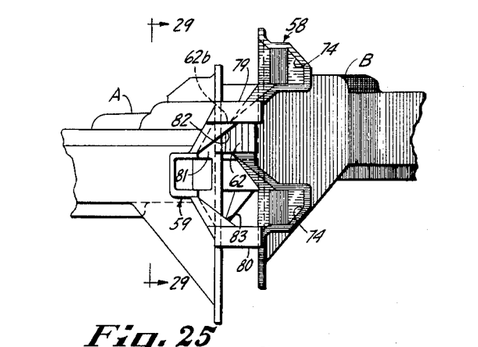
Fig. 25 is a side elevational view of a pair of vertically and laterally displaced couplers illustrating the aligning action of the sloping guide surfaces on the wings of the couplers.
Figure 26:
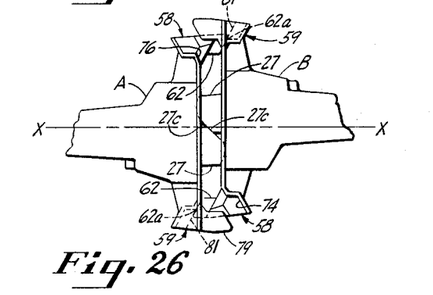
Fig. 26 is a plan view of the Fig. 25 position of the couplers.
Figure 29:
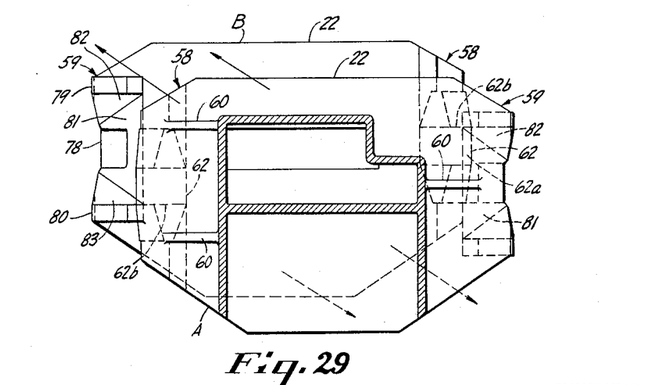
Fig. 29 is a sectional view, taken along line 29—29 of Fig. 25.

Another important feature of the invention resides in the ability of the couplers to couple when displaced both vertically and laterally with respect to one another. Figs. 25, 26 and 29 illustrate the condition where a pair of couplers A and B are not only displaced vertically with respect to one another, but also are angled laterally to opposite sides of the longitudinal center line X—X connecting the pivotal centers of the couplers. As shown in Figs. 26 and 29, the initial contact between the couplers as they move toward one another for coupling occurs between the outer extremities of forward surface 62a on projection 62 of wing 58 of each coupler and the diagonal guide surface 81 between projections 79 and 80 on wing 59 of the opposing coupler (Figs. 26 and 29). At the same time, engagement also occurs between projection 62 on coupler A, and triangularly shaped lower diagonal guide surface 83 on wing 59 of coupler B, as well as between projection 62 on coupler B and triangularly shaped upper diagonal guide surface 82 on wing 59 of coupler A. Engagement also occurs between tapered surfaces 27c on coupling hook members 27, as shown in Fig. 26. Relative sliding will then occur between the couplers as the coupling operation proceeds. Coupler A moves in the direction of the solid line arrows (Fig. 29) while coupler B moves in the direction of the dotted arrows until the couplers are vertically and laterally aligned, after which the projections on one coupler will enter the complementary pocket portions of the opposing coupler to thereby complete the coupling operation.

Figure 27:
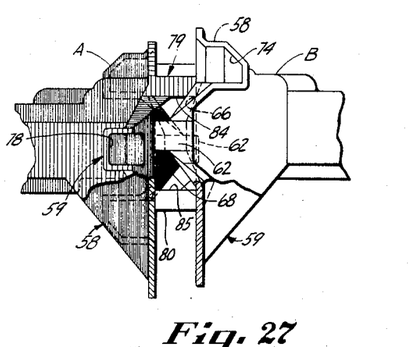
Fig. 27 is a side elevational view partly in section, similar to Fig. 25 but illustrating the aligning action of the sloping surfaces on the wings of the couplers when the latter are laterally displaced to opposite sides of a longitudinal center line connecting the pivotal centers of the couplers from that shown in Figs. 25 and 26.
Figure 28:
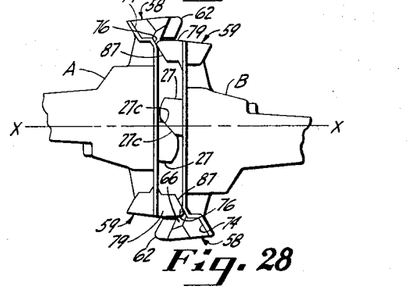
Fig. 28 is a plan view of the Fig. 27 position of the couplers.

Figs. 27 and 28 illustrate a condition where the couplers are again vertically and laterally displaced but the lateral displacement of each coupler is on the opposite side of the longitudinal center line X—X from that shown in Figs. 25 and 26. As seen in Fig. 28, engagement between the couplers, as they move toward one another for coupling, initially occurs between the front surfaces 87 on projections 79 and 80 of each coupler and the rearwardly tapered guide surfaces 76 on wing 58 of the opposing coupler. Simultaneously with the aforesaid engagement, contact also occurs between the lower forward edge of projection 79 on coupler A and the upper diagonal guide surface 66 on wing 58 of coupler B (Fig. 27) as well as between the upper forward edge of projection 80 on wing 59 of coupler B and bottom diagonal guide surface 68 on wing 58 of coupler A. Engagement between tapered surfaces 27c on coupling hooks 27 also occurs, which causes the hooks to pivot slightly outwardly, as shown. Diagonal transverse sliding will then occur between the couplers in a similar manner, as aforedescribed for Figs. 25, 26 and 29, until the couplers are vertically and laterally aligned for coupling.

It will be noted in Figs. 26 and 28 that the engagement between vertically and laterally displaced couplers A and B occurs at points equidistant from and on opposite sides of center line X—X. This effectively prevents jackknifing of the couplers during alignment.

Operation of the coupler is as follows:

Fig. 8 of the drawings shows the internal parts of the coupler in their normal reposed positions ready to couple automatically with an opposing coupler when the couplers are brought together. The relative position of the parts is also substantially the same as that which they occupy when the coupler is in coupled position with another coupler, as in Fig. 9. When two couplers which are in position for coupling approach each other, the head portion 27b of the coupling hook 27 of each of the couplers enters the right-hand side of opening 26 in the front face plate of the opposing coupler and engages portion 50a of the lock, causing the latter to rotate slightly rearwardly. The rearward taper as at 108 of the front face 34 of the hook toward the outer side of the hook (Figs. 11 and 15) ensures that the lock member will be moved rearwardly out of locking position a minimum amount as the hook passes into the head chamber through opening 26. Thus lock 50 will rotate quickly back to locking position, as soon as the coupling hooks on the opposing couplers are moved into interengagement by their associated springs 36, with surface 97 on one hook being in full bearing contact with surface 97 on the opposing hook (Fig. 9).

As the head portion of the hook of one coupler passes through opening 26 in the opposing coupler, arm 40b of cam member 40 of the latter coupler enters and is received in recess 29 in the front face of the hook member. In this connection it will be noted that counterclockwise pivoting of cam 40 is limited by lug 102 (Figs. 8 and 9) extending inwardly from rear wall 24 of the coupler head. This prevents any possibility of the cam being swung rearwardly to a point where it would interfere with coupling operations. Clockwise pivoting of the cam is limited by projection 104 thereon which is adapted for engagement with abutment 106 on the associated coupling hook member 27. Thus it will be seen that the allowable pivotal movement of the cam in either direction is limited so that arm 40b thereof will positively enter the cavity 29 in the forward face of the coupling hook 27 on the opposing coupler during coupling operations.

With the coupling hook members engaged, and pocket and projection structure on the wings of the couplers in interlocking engagement (Fig. 24) the couplers are in fully coupled position. With the couplers in coupled position, it will be noted that body portion 50a of lock member 50 of one coupler engages the outer side of coupling hook member 27 of the opposing coupler (Fig. 9) to maintain the hooks interengaged and the couplers in tight coupled position. Body portion 50a of the lock is of substantial vertical dimension to ensure sufficient bearing area of the lock against side wall 23 of the coupler head.

From the foregoing it will be understood that the novel coupler will couple automatically upon impact with an opposing similar coupler without the necessity of any prior actuation of, or attention to, the coupler. The coupler is at all times in readiness for coupling without the necessity of a trainman having to set or position the coupler parts prior to a coupling operation.

It is to be understood that buffing forces between coupled couplers are applied solely to the front face plates 22, thus avoiding any bending stresses on the aligning wings 58 and 59. In this connection, clearance is provided between surface 87 on projections 79 and 80 and the opposing wall 74a. Also, clearance is provided between surface 62a on projection 62 and opposing wall 78c. Pulling or draft forces are transmitted directly through coupling hooks 27 to pivot pins 30.

When it is desired to uncouple a pair of coupled couplers A and B (Figs. 9 and 10), the uncoupling rod (not shown) of one of the couplers is actuated, thus rotating rotor shaft member 48. Since shaft 48 and lock member 50 are keyed together, as aforedescribed, the body portion 50a of the lock is swung rearwardly into the coupler head. As the lock swings rearwardly, abutment surface 53 on locking portion 50a thereof engages vertical wall 41 on uncoupling cam member 40, thereby causing the cam to pivot in a counterclockwise direction. Thereupon arm 40b on the cam, which in coupled position of the couplers extends into opening 29 in the front face of the coupling hook 27 on the opposing coupler (Figs. 9 and 10), engages side surface 29a in opening 29 in the front face of the opposing hook member, thereby rotating the latter about pivot pin 30 outwardly out of coupling position (Fig. 12). Thus the coupling hook member on one coupler can be readily moved out of coupling position relative to the hook of the opposing coupler to permit separation of coupled couplers.

As seen in Fig. 12, when the coupling hook 27 of coupler A of the mated couplers has been moved to fully uncoupled position by the movement of the lock 50 and associated cam member 40 on the opposing coupler B to permit separation of the couplers, the body portion 50a of the lock of coupler B is in substantially horizontal position (Fig. 14) which corresponds to a condition known in the art as "lock-set." This lock-set position of the lock permits separation of the mated couplers without the necessity of a trainman holding onto the uncoupling rod in order to maintain the coupling hooks out of interengaged relationship. Thus, once the coupler is placed in lock-set condition, the uncoupling rod may be released by the trainman and allowed to assume a reposed position without disturbing the setting of the coupler parts.

Figure 14:
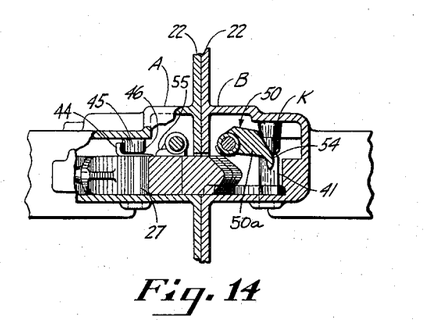
Fig. 14 is a sectional view taken along line 14—14 of Fig. 12.

In the lock-set position, the curved end surface 54 on the lock member of coupler B bears against the upper end of wall 41 on the cam as at K in Fig. 14. Since the hook member in coupler A tends to return to central or coupling position under the action of its associated spring 36, it therefore exerts a force against cam arm 40b tending to rotate the cam in a clockwise direction. However, in this position of the parts, clockwise movement is prevented by the aforesaid engagement K between end surface 54 on the lock member and the upper end of wall 41 on the cam. While the force of spring 36 thus holds the lock in lock-set position, the lock may be readily moved out of lock-set position by simply rotating the uncoupling rod in the opposite direction from that for lock-setting the coupler so as to break the engagement at K to permit the hook member to swing back to coupling relation with the opposing hook. As the hook moves back to central position it moves the cam back to the position shown in Fig. 9 and the lock drops down to locking position. It will be understood that upon separation of the couplers from the lock-set position shown in Figs. 12 and 14 the hook 27 of coupler A will swing back to central position by spring 36 while the lock 50 of coupler B will pivot downwards to reposed position by the action of gravity. Downward pivoting of the lock is assured by the counterweight 50c on the rearward side thereof. Each of the separated couplers is then in readiness for automatic coupling upon impact with an opposing similar coupler without the necessity of adjusting any of the coupler parts.

Assembly of the coupler is as follows:

Cam member 40 is inserted into the coupler head through opening 26 in the front face plate 22 with bottom trunnion 42 received in its opening in the bottom wall 25 of the head and with flange 46 on top wall 25 of the coupler head disposed intermediate flange 44 and trunnion 42 on the upper portion of the cam (Fig. 8). Cam 40 is then rotated until arm portion 40b thereof is in a substantially longitudinally disposed direction as shown in Fig. 8. Next, lock 50 is inserted through opening 26 in the coupler head and is properly positioned so that rotor shaft member 48 may be passed transversely through openings in the side walls of the coupler head and through transverse opening 51 in the lock. The aforementioned key 48c formed on the shaft member is received in slot 51a and keys the lock to the member.

Coupling hook 27 is then inserted into proper position in the head through opening 26 and pin 30 is inserted upward from the underside of the coupler into place to pivotally connect the hook to the head. Pin 30 is maintained in position by the application of the aforementioned pin support mechanism 31. Assembly of the coupler is then complete.

From the foregoing description and accompanying drawings it will be readily understood that a novel, lightweight tight-locking coupler, which is self-aligning in both vertical and horizontal directions and couples automatically upon impact, is provided by the invention. It comprises a rotatable coupling hook member in combination with an uncoupling cam member and a transversely mounted lock member which is adapted to actuate the cam member to move the uncoupling hook on an opposing coupled coupler out of coupling position to permit separation of the couplers. It will also be seen that the novel coupler embodies integral train line service connections in the front face thereof which couple automatically with corresponding connections on an opposing similar coupler when the couplers move to coupled position, thus eliminating the need for flexible, manually operated hose couplings associated with the couplers.

The terms and expressions which have been employed are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A car coupler comprising a head, a coupling hook pivotally mounted in said head, a lock member rotatably mounted in said head, said lock being rotatable into and out of a locking position disposing the lock between the coupling hook of an opposing similar coupler coupled with said coupler and a side wall of said head wherein the last-named hook is held in coupled position with the first-named hook, said head comprising means laterally supporting the lock in said locking position, an uncoupling cam member engageable with the coupling hook of an opposing coupled coupler, said lock upon actuation thereof being movable out of locking position and into engagement with said cam member to actuate the same, said cam member upon actuation thereof by said lock being adapted to move the coupling hook of the opposing coupled coupler out of coupling position.

2. A car coupler in accordance with claim 1, wherein spring means is provided in said head to urge said coupling member into coupling position.

3. A car coupler in accordance with claim 2, wherein stop means extends downwardly into said head, said means being engageable with said coupling member to limit pivotal movement of said coupling member in coupling position under the action of said spring means.

4. In a car coupler comprising a head, a coupling hook member pivotally mounted in said head, and an uncoupling cam pivotally mounted in said head laterally of said hook member, said cam comprising a forwardly extending arm adapted to be received in a recess in the coupling hook member of a similar opposing coupler when the couplers are in coupled position, said cam upon actuation thereof being adapted to slidingly engage said last-mentioned member to pivot the same out of coupling position.

5. A car coupler comprising a head, a coupling member pivotally mounted in said head, a lock member pivoted in said head, said lock member comprising a generally vertically extending locking portion adapted for engagement with the coupling member of an opposing coupled coupler to maintain said last-mentioned member in coupling position with said coupling member, an uncoupling cam member pivotally mounted in said head, said lock upon being pivoted out of locking position operable to actuate said cam member to cause the latter to engage the coupling member of the opposing coupled coupler to pivot the same to uncoupling position, said lock extending in a substantially horizontal direction and being held in the last-mentioned position by said cam when said coupling member on said opposing mated coupler is in said uncoupling position.

6. A car coupler in accordance with claim 5, wherein said locking portion of said lock is disposed at the end thereof opposite from the pivotal axis of the lock so that said portion swings by gravity back to its generally vertical locking position upon separation of the mated couplers.

7. In a car coupler, a pivotally movable coupling hook, a lock movably supported within said coupler for movement into and out of the locking position between a side wall portion of the coupler and a portion of the hook of a similar opposing coupler projecting inwardly of said coupler, means rigidly associated with said wall portion providing lateral support for the lock in said locking position, and lock-actuated uncoupling means, said uncoupling means being engageable with the hook of an opposing similar coupler to move the opposing hook out of coupling position when said hook is in coupled relationship with the hook of the opposing coupler, said uncoupling means projecting forwardly within the first-named coupler into the region occupied by said last-named hook when said couplers are intercoupled.

8. A coupler in accordance with claim 7, in which said hook is recessed for receiving a forward portion of the uncoupling member on an opposing similar coupler when the couplers are in coupled relationship.

9. In a car coupler of the tight-locking type, a vertical front face plate adapted for buffing contact with the plate on an opposing similar coupler when the couplers are in coupled position, means for maintaining the couplers in coupled position with the plates in contact, said means comprising a coupling hook pivoted within the coupler with respect to a vertical axis and extending forwardly through an opening in said plate, said hook being adapted for pulling engagement with the hook of an opposing coupler, a lock pivoted within the coupler with respect to a horizontal axis for movement between a rearward uncoupling position and a forward coupling position in lateral spaced relation with a position of the hook corresponding to coupled relation of the couplers, said lock rotatable into engagement with lateral surface of the hook of an opposing coupler to prevent movement of the hook out of said pulling engagement, and an uncoupling shaft member rotatably mounted in said head, said lock being connected to said member for rotation therewith out of locking position.

10. An uncoupling cam for a car coupler of the type described comprising a generally vertically disposed body portion and a generally horizontally projecting arm portion, said body portion comprising top and bottom trunnions for pivotally mounting said cam in the coupler, and a generally vertical wall extending upwardly from said arm portion and radially outwardly from said body portion, and an arcuate flange on said body portion concentrically spaced from said top trunnion.

11. A lock for a car coupler of the type described, comprising a vertically disposed locking portion and an integral tubular portion extending laterally from said locking portion, said locking portion on the rearward side thereof comprising a generally forwardly and downwardly tapered abutment surface for sliding engagement with an uncoupling cam member in said car coupler for actuating the cam.

12. A lock in accordance with claim 11, wherein the bottom portion of said abutment surface is of an arcuate configuration.

13. A tight locking car coupler comprising a head, said head having a generally flat front face plate, a coupling hook pivotally mounted in said head and extending forwardly through an opening in said plate, said head having interlocking means comprising wings laterally spaced on either side of said plate, each of said wings having at least one pocket portion and at least one projection thereon for receiving respectively in relatively tight fitting relationship a complementary projection and a pocket portion on the plate of an opposing similar coupler when the couplers are in coupled position, each of said wings comprising coupler aligning means disposed between said pocket portion and said projection, said means comprising at least one diagonally extending surface adapted for sliding engagement with the opposing coupler during coupling operations to align the couplers from vertically and laterally displaced positions.

14. Interlocking and aligning means for a car coupler comprising a wing extending laterally from the coupler head, said wing comprising a pair of vertically spaced pocket portions, a projection positioned intermediate said pocket portions, said pocket portions being spaced rearwardly of said projection, a pair of guide surfaces disposed above said projection and a pair of guide surfaces disposed below said projection, said surfaces of each of said pairs being disposed laterally of one another and extending between said projection and the corresponding one of said pocket portions, each of said surfaces being sloped rearwardly and diagonally in a transverse direction and being adapted for sliding engagement with an opposing car coupler during coupling operations to vertically and laterally align the couplers for coupling, each of said pocket portions and said projection being adapted to cooperate respectively with a projection and pocket portion on an opposing coupler to limit relative vertical and lateral movement between the couplers after the latter are in coupled position.

15. Interlocking and aligning means for a car coupler comprising a wing extending laterally from the coupler head, said wing comprising a substantially vertically disposed, rearwardly and outwardly sloping guide surface, a pocket portion extending rearwardly from said surface, a pair of vertically spaced projections, said projections being disposed above and below said pocket portion and being disposed forwardly thereof, other guide surfaces disposed above and below said pocket portion and extending respectively between the upper and lower extremities of said first-mentioned surface and the associated one of said projections, said second mentioned surfaces sloping rearwardly and diagonally in a transverse direction, said first and second mentioned surfaces being adapted for sliding engagement with an opposing car coupler during coupling operations to vertically and laterally align the couplers for coupling, each of said projections and said pocket portion being adapted to cooperate respectively with a pocket portion and a projection on an opposing coupler to limit relative vertical and lateral movement between the couplers after the latter are in coupled position.

16. A tight locking car coupler comprising a head, said head having a generally flat front face plate disposed substantially perpendicular to the longitudinal center line of the coupler and defining the forward extremity of the coupler head, a coupling hook pivotally mounted in said head and extending forwardly through an opening in said plate, said head having interlocking means comprising lateral wings extending from said plate, said wings comprising a pair of vertically spaced pocket portions and a forwardly extending projection disposed intermediate said pocket portions on one side of the coupler head, and a pair of vertically spaced projections and a pocket portion disposed intermediate said projections on the other side of the coupler head, said pocket portions and said projections on said wings comprising substantially horizontal and vertical abutment surfaces adapted to cooperate with complementary surfaces on the projections and pocket portions of the wings of a similar opposing coupler to limit relative vertical and lateral movement between the couplers when the latter are in coupled position.

17. A tight locking car coupler comprising a head, said head having a substantially flat front face plate, a coupling hook member pivotally mounted in said head and extending forwardly thereof through an opening in said plate, said head having lateral wings adjacent said plate, said wings comprising forwardly extending projections and rearwardly recessed pocket portions, said projections and pocket portions being adapted to cooperate in abutting engagement with the pocket portions and projections of a similar opposing coupler to limit relative vertical and lateral movement between the couplers when in coupled position, said projections and pocket portions having parallel surfaces for guiding the couplers in substantially straight line direction during movement of the couplers into said coupled position.

18. A car coupler in accordance with claim 17 in which said projections extend forwardly of said plate.

19. A car coupler in accordance with claim 17, wherein said projection portions and said pocket portions comprise substantially flat, horizontally and vertically disposed abutment surfaces.

20. In a car coupler comprising a head, a coupling hook pivotally mounted in said head, a lock movable between an uncoupling position and a locking position, an uncoupling member pivotally mounted and arranged within said head for being engaged and rotated by the lock in movement thereof from said locking position to said uncoupling position, and when actuated by the lock to engage and move the coupling hook of a similar coupler to said coupler out of engaagement with said first-named coupling hook.

21. In a car coupler, a pivotally movable coupling hook, a lock rotatable in one direction to engage the hook of an opposing similar coupler to maintain the couplers in coupled position, and an uncoupling member, said lock being rotatable in the opposite direction to actuate said uncoupling member, said member when actuated by said lock being engageable with the hook of an opposing similar coupler to move said hook of the opposing coupler out of coupled relation with said hook.

22. In a car coupler, a pivoted coupling hook for pulling engagement with the hook of an opposing similar coupler when the couplers are in coupled relationship, and a mechanically rotatable lock member spaced from said hook, the hook of an opposing similar coupler passing between said first-named hook and said lock member during a coupling operation, means constantly urging the rotation of said lock member into a locking position for positioning the hook of an opposing similar coupler between said lock member and said first-named hook when the couplers reach said coupled relationship to maintain the hook of an opposing similar coupler in said pulling engagement.

23. In a car coupler, a pivoted coupling hook having a pulling surface disposed substantially at right angles to the longitudinal axis of the couplers, a rotatable lock having a horizontal tubular portion and a locking portion at one end thereof, said locking portion being spaced from said hook, the hook of an opposing similar coupler passing between said locking portion and said hook during a coupling operation, said locking portion being counterweighted to render it rotatable by gravity against the hook of an opposing similar coupler when said pulling surface has become engaged with a corresponding surface on the hook or an opposing similar coupler to maintain the couplers in pulling engagement when the couplers are in coupled position.

24. In a car coupler comprising a head, a coupling hook pivotally mounted in said head, a lock movable between an uncoupling position and a locking position wherein it engages and disposes between it and the coupling hook a portion of a coupling member of another similar coupler protruding into said coupler, an uncoupling member pivotally mounted in relation to the lock and the portion of the coupling hook of another coupler protruding into said first-named coupler to be engaged and rotated by the lock as it moves from the locking position to the uncoupling position and, in being rotated, to engage and move said coupling hook portion out of engagement with said first-named coupling hook.

25. In a car coupler comprising a head having a substantially flat face defining the forward extremity thereof, a coupling hook mounted at operative positions of the coupler in pivotal relation with a vertical axis in said head and projecting through an opening in said plate, resilient means for urging said coupling hook into coupling position, a lock supported in pivotal relation with an axis in horizontal relation to said vertical axis, and an uncoupling cam member mounted in pivotal relation with an axis generally parallel to said vertical axis, said lock being rotatable rearwardly relative to the face plate from its coupling position to a lock-set position in which the lock is aligned substantially horizontally with its axis, said member having an arm extending forwardly relative to its pivotal axis for engaging the coupling hook of an opposing similar coupler and a vertical wall extending into the path of movement of the lock between said two positions at the rear of the lock, the coupling hook of the opposing coupler being urged by its associated resilient means into tight engagement with said member at said horizontal lock-set position of the lock to retain said wall of the member in tight engagement with the lock whereby the lock is maintained in lock-set position.

References Cited in the file of this patent

UNITED STATES PATENTS

| | | |
|---|---|---|
| 1,636,139 | Larsson | July 19, 1927 |
| 1,636,157 | Tomlinson | July 19, 1927 |
| 1,639,717 | Averill | Aug. 23, 1927 |
| 1,749,149 | Mead | Mar. 4, 1930 |
| 1,989,894 | Tomlinson | Feb. 5, 1935 |
| 2,214,036 | Van Dorn | Sept. 10, 1940 |
| 2,413,003 | Van Dorn | Sept. 10, 1940 |
| 2,772,791 | Wolfe | Dec. 4, 1956 |